US012657853B2

(12) United States Patent
Kim

(10) Patent No.: US 12,657,853 B2
(45) Date of Patent: Jun. 16, 2026

(54) DEVICE FOR PROCESSING ORAL IMAGE AND METHOD FOR PROCESSING ORAL IMAGE

(71) Applicant: MEDIT CORP., Seoul (KR)

(72) Inventor: Jin Young Kim, Seoul (KR)

(73) Assignee: MEDIT CORP., Seoul (KR)

( * ) Notice: Subject to any disclaimer, the term of this patent is extended or adjusted under 35 U.S.C. 154(b) by 173 days.

(21) Appl. No.: 18/573,147

(22) PCT Filed: Jun. 21, 2022

(86) PCT No.: PCT/KR2022/008773
§ 371 (c)(1),
(2) Date: Dec. 21, 2023

(87) PCT Pub. No.: WO2022/270868
PCT Pub. Date: Dec. 29, 2022

(65) Prior Publication Data
US 2024/0378834 A1     Nov. 14, 2024

(30) Foreign Application Priority Data

Jun. 21, 2021     (KR) ......................... 10-2021-0080358

(51) Int. Cl.
*G06T 19/20*          (2011.01)
*A61C 9/00*          (2006.01)
(Continued)

(52) U.S. Cl.
CPC ............ *G06T 19/20* (2013.01); *A61C 9/0053* (2013.01); *G06T 17/00* (2013.01); *G06V 10/82* (2022.01);
(Continued)

(58) Field of Classification Search
None
See application file for complete search history.

(56) References Cited

U.S. PATENT DOCUMENTS

2011/0136077 A1* 6/2011 De Moyer ......... A61C 13/0004
                                              433/213
2015/0366644 A1* 12/2015 Sim ........................ A61C 9/002
                                              433/49
(Continued)

FOREIGN PATENT DOCUMENTS

JP       2003-075139 A      3/2003
KR       10-1505529 B1      3/2015
(Continued)

OTHER PUBLICATIONS

Office Action issued from Korean Patent Application No. 10-2021-0080358 issued on Mar. 7, 2023.
(Continued)

*Primary Examiner* — Zhengxi Liu
(74) *Attorney, Agent, or Firm* — Sughrue Mion, PLLC

(57)          ABSTRACT

Provided is a method for processing an oral image, the method including scanning two or more of a maxillary base model, a mandibular base model, and an abutment model together to obtain a multiple model image, scanning an occlusal model to obtain an occlusal model image, the occlusal model having a shape in which the maxillary base model and the mandibular base model are occluded, and aligning overlapping regions from the multiple model image and the occlusal model image to obtain a three-dimensional oral model, wherein the abutment model is detachable from the base model.

15 Claims, 10 Drawing Sheets

(51) Int. Cl.
    *G06T 17/00*       (2006.01)
    *G06V 10/82*       (2022.01)

(52) U.S. Cl.
    CPC .. *G06T 2210/41* (2013.01); *G06T 2219/2004*
              (2013.01); *G06V 2201/03* (2022.01)

(56)             References Cited

U.S. PATENT DOCUMENTS

| | | | |
|---|---|---|---|
| 2020/0289206 A1 * | 9/2020 | Rosinski ............... | A61B 34/25 |
| 2021/0196434 A1 * | 7/2021 | Cramer ................ | G06T 7/0012 |

FOREIGN PATENT DOCUMENTS

| | | | | |
|---|---|---|---|---|
| KR | 10-1602749 B1 | 3/2016 | | |
| KR | 10-2017-0113300 A | 10/2017 | | |
| KR | 10-1794561 B1 | 11/2017 | | |
| KR | 10-1869895 B1 | 6/2018 | | |
| KR | 10-2020-0114381 A | 10/2020 | | |
| KR | 10-2221958 B1 | 3/2021 | | |
| WO | 02/34154 A2 | 5/2002 | | |
| WO | WO-2021096041 A1 * | 5/2021 | ............. | A61C 13/34 |
| WO | WO-2022085090 A1 * | 4/2022 | ......... | A61C 13/1016 |

OTHER PUBLICATIONS

Notice of Allowance issued from Korean Patent Application No. 10-2021-0080358 issued on Sep. 11, 2023.
International Search Report for PCT/KR2022/008773 dated Sep. 22, 2022 (PCT/ISA/210).
Written Opinion for PCT/KR2022/008773 dated Sep. 22, 2022 (PCT/ISA/237).

* cited by examiner

DEVICE FOR PROCESSING ORAL IMAGE AND METHOD FOR PROCESSING ORAL IMAGE

CROSS REFERENCE TO RELATED APPLICATIONS

This application is a National Stage of International Application No. PCT/KR2022/008773 filed Jun. 21, 2022, claiming priority based on Korean Patent Application No. 10-2021-0080358 filed Jun. 21, 2021.

TECHNICAL FIELD

Embodiments disclosed herein relate to an oral image processing device and an oral image processing method, and more specifically, to a device and method for processing or manipulating an oral image.

BACKGROUND ART 3D scanners have been used for dental treatment of patients. A 3D scanner may also be referred to as a table scanner in that the 3D scanner scans an object placed on a table using the rotation of the table. The 3D scanner may obtain surface information about an object as raw data by scanning a plaster model that imitates the oral cavity of a patient.

When there are a plurality of objects to be scanned, the 3D scanner has to scan each of the objects, an thus, it takes a considerable amount of time to scan all of the plurality of objects. This is also inconvenient in that a user has to manually change the objects to be scanned on the table of the 3D scanner to perform the scan.

Therefore, a method and device capable of more conveniently and accurately scanning a plurality of objects are required.

DISCLOSURE

Technical Solution

A method for processing an oral image, according to an embodiment, includes scanning two or more of a maxillary base model, a mandibular base model, and an abutment model together to obtain a multiple model image, scanning an occlusal model to obtain an occlusal model image, the occlusal model having a shape in which the maxillary base model and the mandibular base model are occluded, and aligning overlapping regions from the multiple model image and the occlusal model image with each other to obtain a three-dimensional oral model, wherein the abutment model is detachable from the base model.

DESCRIPTION OF DRAWINGS

FIG. 5 is an example of a detailed block diagram of an oral image processing system including a 3D scanner and a data processing device.

MODE FOR INVENTION

Figure 1:
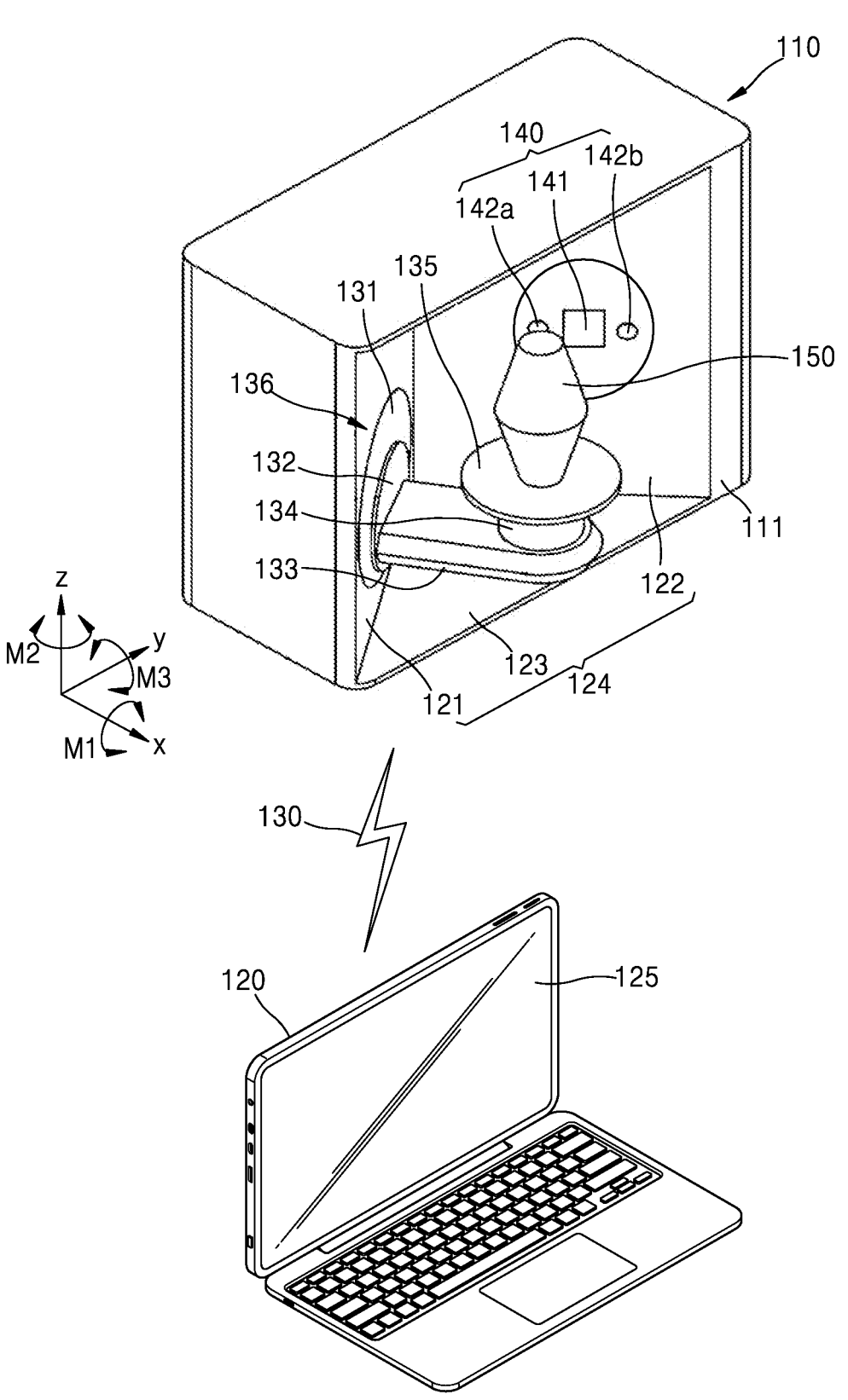
FIG. 1 is a view for illustrating an oral image processing system according to an embodiment.

In an embodiment, the obtaining of the multiple model image may include scanning the abutment model together with a corresponding base model to obtain an abutment model image and a corresponding base model image.

In an embodiment, the obtaining of the multiple model image may further include scanning a base model to which the abutment is coupled to obtain an abutment-coupled base model image, and the obtaining of the three-dimensional oral model may include aligning the abutment model image with the abutment-coupled base model image or the occlusal model image.

In an embodiment, the obtaining of the multiple model image may include scanning the abutment model together with a base model from which the abutment is separated, to obtain an abutment model image and an abutment-separated base model image.

In an embodiment, the obtaining of the three-dimensional oral model may include aligning the abutment model image with the occlusal model image.

In an embodiment, the obtaining of the multiple model image may include scanning a plurality of abutment models together to obtain an abutment model image and scanning a base model to which the plurality of abutment models are coupled to obtain an abutment-coupled base model image, wherein the obtaining of the three-dimensional oral model includes aligning the abutment model image with the abutment-coupled base model image or the occlusal model image.

In an embodiment, the method may further include identifying which image among the abutment-coupled base model image and the occlusal model image is to be aligned first with the abutment model image.

In an embodiment, the method may further include identifying which model among the maxillary base model, the mandibular base model, the abutment model, and the occlusal model is an object to be scanned.

In an embodiment, the identifying may include using a neural network learning to identify an object from a plurality of oral images to thereby identify an object to be scanned in the multiple model image and the occlusal model image.

In an embodiment, the identifying may further include recognizing identification information that belongs to the object to be scanned in the multiple model image and the occlusal model image and identifying a type of the object from the identification information.

In an embodiment, the method may further include recognizing a scan region on a tray on which the object to be scanned is arranged, determining whether the object is located outside the scan region, and outputting a notification signal when it is determined that the object is located outside the scan region.

A device for processing an oral image, according to an embodiment includes a processor that executes at least one instruction, wherein the processor cans two or more of a maxillary base model, a mandibular base model, and an abutment model together to obtain a multiple model image, scans an occlusal model to obtain an occlusal model image, the occlusal model having a shape in which the maxillary base model and the mandibular base model are occluded, and aligns overlapping regions from the multiple model image and the occlusal model image with each other to obtain a three-dimensional oral model, wherein the abutment model is detachable from the base model.

A computer-readable recording medium according to an embodiment is a computer-readable recording medium on which a program for performing a method for processing an oral image is recorded, wherein the method includes scanning two or more of a maxillary base model, a mandibular base model, and an abutment model together to obtain a multiple model image, scanning an occlusal model to obtain an occlusal model image, the occlusal model having a shape in which the maxillary base model and the mandibular base model are occluded, and aligning overlapping regions from the multiple model image and the occlusal model image to obtain a three-dimensional oral model, wherein the abutment model includes at least one of the maxillary abutment model coupled to the maxillary base model and the mandibular abutment model coupled to the mandibular base model.

This specification describes principles of the application and sets forth embodiments thereof to clarify the scope of rights of the application and to allow those skilled in the art to practice the embodiments of the application. The embodiments disclosed herein may have different forms.

Like reference numerals refer to like elements throughout. This specification does not describe all elements of embodiments, and general information in the technical field to which the application belongs or a repeated description between embodiments is omitted. The term 'part or portion' used herein may be provided as software or hardware, and a plurality of 'portions' may be provided as a single unit or element depending on embodiments. Also, a single 'part or portion' may include a plurality of elements. Hereinafter, operation principles and embodiments of the application are described with reference to the accompanying drawings.

An image used herein may include an image that shows at least one tooth, an oral cavity including at least one tooth, or a plaster model for the oral cavity (hereinafter, referred to as an 'oral image').

Also, the image used herein may include a two-dimensional (2D) image of an object or a three-dimensional (3D) oral image that three-dimensionally represents an object. The 3D oral image may be generated by three-dimensionally modeling the structure of the oral cavity on the basis of the received raw data and thus may be referred to as a 3D oral cavity model.

Hereinafter, in this specification, the oral image is used to refer to a model or image representing the oral cavity in two or three dimensions.

In addition, data used herein may refer to information required to represent an object in two or three dimensions, for example, raw data obtained by using at least one camera.

Specifically, the raw data may refer to data obtained to create an oral image and may include data (e.g., 2D data) obtained from at least one image sensor belonging to a 3D scanner when scanning an object using the 3D scanner. The raw data obtained from the 3D scanner may also be referred to as scan data or 2D image data. The raw data may refer to 2D images from different viewpoints, which are obtained by a plurality of cameras when scanning an object using the 3D scanner.

Above, the raw data is described as a 2D image, but an embodiment is not limited thereto and may include 3D image data.

In this specification, an object is a subject to be photographed and may include a model formed by imitating a part of the body. The object may include a plaster model or impression model that imitates the oral cavity, an artificial structure insertable into the oral cavity, or a plaster model or impression model that imitates an artificial structure. For example, the object may include a plaster model or impression model for the teeth or gingiva, and/or an artificial structure insertable into the oral cavity, or a plaster model or impression model for the artificial structure. Here, the artificial structure insertable into the oral cavity may include, for example, at least one of orthodontic devices, implants, crowns, inlays, onlays, artificial teeth, and orthodontic aids inserted into the oral cavity. Also, the orthodontic device may include at least one of a bracket, an attachment, an orthodontic screw, a lingual orthodontic device, and a removable orthodontic retainer.

In an embodiment, the object may include at least one of a maxillary base model, a mandibular base model, and an occlusal model. The base model may refer to a model in which a tooth model is placed and fixed. The maxillary base model may refer to a model in which a plaster model imitating the maxilla, that is, the upper jaw of the oral cavity, is placed. The mandibular base model may refer to a model in which a plaster model imitating the mandible, that is, the lower jaw of the oral cavity, is placed. The occlusal model may refer to a model in which the maxillary base model and the mandibular base model are occluded.

In an embodiment, a prosthetic appliance is an artificial replacement for a tooth or related tissue and may include a crown, a bridge, a partial denture, etc. The prosthetic appliance may be manufactured based on a margin line of an abutment in the maxillary base model or the mandibular base model.

The abutment may refer to a tooth that supports the prosthetic appliance during a treatment planning stage before fixed or removable prosthetic treatment. In an embodiment, the object may include an abutment model. The abutment model is a plaster model that imitates the abutment of the maxilla or mandible in the oral cavity and may include a model containing a margin line used to create the prosthetic appliance. In an embodiment, when there are no teeth to support the prosthetic appliance, the abutment model may include an artificial structure replacing a tooth, such as an implant, or a model for the artificial structure.

Alternatively, the abutment model may refer to individual teeth of the maxillary base model or the mandibular base model.

When there are a plurality of objects to be scanned with a 3D scanner and scanning is performed for each of the objects, it takes a considerable amount of time so that all of the plurality of objects are scanned. Additionally, it is inconvenient in that users, such as dentists, have to manually change the objects to be photographed one by one.

The embodiments disclosed herein are intended to overcome the above-mentioned limitations and provide a method and device for obtaining images of a plurality of objects by scanning the plurality of objects together.

Hereinafter, embodiments are described in detail with reference to the drawings.

FIG. 1 is a view for illustrating an oral image processing system according to an embodiment.

Referring to FIG. 1, the oral image processing system may include a 3D scanner 110 and a data processing device 120 connected to the 3D scanner 110 via a communication network 130.

The 3D scanner 110 may be a medical device that obtains an image of an object. The 3D scanner 110 may obtain an image of at least one of an oral cavity, an artificial structure, and a plaster model of the oral cavity or artificial structure.

In an embodiment, the 3D scanner 110 may be a table scanner. The table scanner may be a scanner that obtains surface information about an object as raw data by scanning the object using the rotation of a table.

The 3D scanner 110 may include an inner space 124 that is recessed toward the inside of a housing 111. The inner space 124 may be formed by a first inner surface 121, a second inner surface 122, a third inner surface 123 (bottom surface) in contact with the lower end of the first inner surface 121 and the lower end of the second inner surface 122, and a fourth inner surface (ceiling surface) (not shown) in contact with the upper end of the first inner surface 121 and the upper end of the second inner surface 122.

A moving unit 136 capable of holding an object 150 and moving the object 150 may be formed in the inner space 124 of the 3D scanner 110. The moving unit 136 may include a fixed base 131, a first rotating portion 132, and a beam portion 133.

The fixed base 131 may be fixed to the first inner surface 121 and connected to the first rotating portion 132. The first rotating portion 132 may rotate around a point on the fixed base 131 as the central axis, for example, in a first rotational direction M1 with an x-axis as the central axis in FIG. 1. The beam portion 133 may protrude from the first rotating portion 132 while one end thereof is connected to the first rotating portion 132. When the first rotating portion 132 rotates in the first rotational direction M1, the beam portion 133 connected to the first rotating portion 132 may also rotate in the first rotational direction M1 together with the first rotating portion 132.

The beam portion 133 may be extended or shortened in the x-axis direction. A second rotating portion 134 having a cylindrical shape may be coupled to the other end of the beam portion 133. The second rotating portion 134 may rotate in a second rotational direction M2 with the z-axis as the rotation axis.

The moving unit 136 may move up and down in the z-axis direction. As the moving unit 136 moves in the up and down direction, the beam portion 133 may also move in parallel in the up and down direction in the z-axis direction. Here, the up and down direction may include both a positive z-axis direction and a negative z-axis direction.

A tray 135 may be provided on one surface of the second rotating portion 134 and rotate together with the second rotating portion 134 when the second rotating portion 134 rotates in the second rotational direction M2. The tray 135 may also be referred to as a table. The tray 135 may be formed in a dish or disk shape and have a diameter greater than the diameter of the second rotating portion 134 in order to stably support the object 150.

In an embodiment, the 3D scanner 110 may adjust the height of the object 150 placed on the tray 135 by moving the moving unit 136 to adjust the height of the tray 135. Also, the 3D scanner 110 may measure the height of the object 150. The 3D scanner 110 may obtain the uppermost point and the lowermost point of the object 150 from images obtained by cameras 142a and 142b and detect the measurement center of the object 150 using these points. The 3D scanner 110 may move the moving unit 136 in the z-axis direction so that the measurement center of the object 150 matches the center point in the images obtained by the cameras 142a and 142b.

Also, an optical unit 140 may be provided on the second inner surface 122 in the inner space 124 of the housing 111. The optical unit 140 may include a light emitting portion 141 that emits light to the object 150 and at least one camera 142a or 142b that receives light reflected from the object 150.

In an embodiment, the 3D scanner 110 may obtain 3D data about the object using a confocal method. The confocal method is a non-destructive optical imaging technique for 3D surface measurement and may obtain optical cross-sectional images with high spatial resolution using a pinhole structure. The 3D scanner 110 may obtain 3D data by stacking 2D images obtained in the axial direction.

In an embodiment, the 3D scanner 110 may include an optical 3D scanner. The optical 3D scanner 110 may use a structured light with stereo vision to obtain 3D data on the surface of the object 150.

The light emitting portion 141 may emit a specific type of light toward the object 150. Here, the wavelength of the emitted light may include, but not limited to, for example, a wavelength in a visible light region.

In an embodiment, the light emitting portion 141 projects pattern light onto the object 150 and scans the object 150 irradiated with the pattern light, and 3D data representing the shape of the object 150 may be obtained by using the principle of triangulation measurement due to deformation of pattern. To this end, the light emitting portion 141 may be configured such that light generated from a light source is formed as structured light having a specific pattern. The light emitting portion 141 may use a pattern mask or a digital microarray device (DMD) so as to form a certain pattern. The structured light may have at least one pattern, and in some cases, may have two or more patterns. Here, various types of patterns may be formed, for example, a stripe pattern may be formed.

The light emitting portion 141 may emit the structured light having a specific pattern to the object 150.

The cameras 142a and 142b may receive light reflected from the surface of the object 150 and generate image data by using an imaging sensor connected to the cameras 142a and 142b. For example, the imaging sensor may include an element, such as a CMOS image sensor, which converts light into digital data.

In an embodiment, the cameras 142a and 142b may correspond to a right field of view and a left field of view, respectively. The cameras 142a and 142b may obtain an R image corresponding to the right field of view and an L image corresponding to the left field of view. The R image and L image may be reconstructed into a 3D image frame representing the surface of the object 150.

The 3D scanner 110 may continuously obtain 2D image frames including the L image and the R image for the object 150. That is, the cameras 142a and 142b are mounted on the rotating tray 135 and scan the object 150 rotating with the tray 135 at regular time intervals (for example, 10 to 30 frames per second) to thereby obtain a plurality of 2D frames.

In an embodiment, the cameras 142a and 142b may be spaced apart from the light emitting portion 141 by a certain distance and selectively receive light reflected from the surface of the object 150. For example, as shown in FIG. 1, the two cameras 142a and 142b may be provided on a straight line together with the light emitting portion 141 and spaced apart from each other by a certain distance in the left and right directions from the light emitting portion 141 with the light emitting portion 141 as the center.

In an embodiment, the optical unit 140 may further include a second rotating unit (not shown) that is coupled to the second inner surface 122 and rotates the light emitting portion 141, the first camera 142a, and the second camera 142b in one direction, with the center of the light emitting portion 141 as the rotation axis. The second rotating unit may be provided on the second inner surface 122 and rotate the light emitting portion 141, the first camera 142a, and the second camera 142b in a third rotational direction M3. Here, the third rotational direction M3 may be, for example, a rotation direction centered on the y-axis direction and may include a clockwise or counterclockwise direction.

For example, in FIG. 1, when the light emitting portion 141 emits a vertical stripe pattern and the cameras 142a and 142b are arranged on the left and right sides of the light emitting portion 141, that is, when the cameras 142a and 142b are arranged in a direction perpendicular to a flow direction of the vertical stripe pattern, the cameras 142a and 142b may obtain an image of the object 150 on which the vertical stripe pattern is applied. When the second rotating unit rotates 90 degrees clockwise or 90 degrees counterclockwise along the y-axis, the light emitting portion 141 and the cameras 142a and 142b are also rotated and arranged in a line in the vertical direction. Here, the light emitted from the light emitting portion 141 may have the same shape as a horizontal stripe pattern. Accordingly, the cameras 142a and 142b may obtain an image of the object 150 on which the horizontal stripe pattern is emitted.

In an embodiment, the cameras 142a and 142b may be placed at various locations around the light emitting portion 141, with the light emitting portion 141 as the center. In addition, in some cases, the light emitting portion 141 may further include cameras in addition to the cameras 142a and 142b shown in FIG. 1. The plurality of cameras may selectively receive light reflected from the object 150 according to the pattern shape of the light emitted from the light emitting portion 141. For example, when the stripe pattern emitted by the light emitting portion 141 rotates as the second rotating unit rotates, only the camera located in the longitudinal direction of the emitted stripe pattern, that is, in the direction perpendicular to the flow direction, among the plurality of cameras, may operate selectively and obtain an image of the object 150.

In an embodiment, when there are a plurality of objects to be scanned, the 3D scanner 110 may scan the plurality of objects together. For example, when the objects to be scanned include a maxillary base model, a mandibular base model, and an abutment model separated from the maxillary base model, the 3D scanner 110 may acquire a multiple model image by scanning two or more models among the maxillary base model, the mandibular base model, and abutment model together. Additionally, the 3D scanner 110 may obtain an occlusal model image by scanning an occlusal model in which the maxillary base model and the mandibular base model are occluded. The 3D scanner 110 may transmit the obtained raw data to the data processing device 120 connected via the communication network 130.

The data processing device 120 may be connected to the 3D scanner 110 via a wired or wireless communication network 130. The data processing device 120 may include, but not limited to, computing devices, such as a smart phone, a laptop computer, a desktop computer, a personal digital assistant (PDA), or a tablet personal computer (PC). In addition, the data processing device 120 may be provided in the form of a server (or a server device) for processing an oral image.

The data processing device 120 may generate the 3D oral image three-dimensionally representing the oral cavity on the basis of the 2D image data received from the 3D scanner 110 and may display the 3D oral image via a display 125.

In an embodiment, the data processing device 120 may identify the type of object 150 in the 3D oral image generated based on the 2D image data received from the 3D scanner 110 and may obtain object identification information. The object identification information may refer to information that identifies which of the maxillary base model, the mandibular base model, the abutment model, and the occlusal model is the object.

In an embodiment, the data processing device 120 may obtain the object identification information from the image of the object 150 that is currently being scanned, using a neural network learning to identify the object from an input image.

In an embodiment, the data processing device 120 may receive the object identification information about the object 150 to be scanned from a user.

In an embodiment, the data processing device 120 may identify the object 150 according to the location information of the object 150, using the tray 135 that includes the location information of the object 150.

In an embodiment, a user may directly write object identification information on the object 150 to be scanned and scan the object 150 on which the object identification information is written. In this case, the data processing device 120 may recognize the identification information from the image of the object 150 and identify the object 150 according to the recognized identification information.

In an embodiment, the data processing device 120 may recognize, from the image of the object 150, a scan region on the tray 135 on which the object 150 is placed. The data processing device 120 determines whether the object 150 is located outside the scan region, and a signal notifying this state may be generated when it is determined that the object 150 is outside the scan region. The data processing device 120 may directly output at least one of various types of notifications, such as light, vibration, audio signals, and video signals, indicating this state or may transmit this state to the 3D scanner 110 so that the 3D scanner 110 outputs a notification signal.

In an embodiment, the data processing device 120 may obtain a 3D oral model for the entire object 150 by finding matching points in a plurality of 3D oral images and merging or aligning the positions.

In another example, the 3D scanner 110 may scan the object 150 to obtain raw data, process the obtained raw data to create a 3D oral image that three-dimensionally represents the oral cavity, and transmit the generated 3D oral image to the data processing device 120.

The data processing device 120 may additionally analyze, process, and manipulate the 3D oral image received from the 3D scanner 110 and then allow the results to be displayed or transmitted to an external device.

Figure 2:
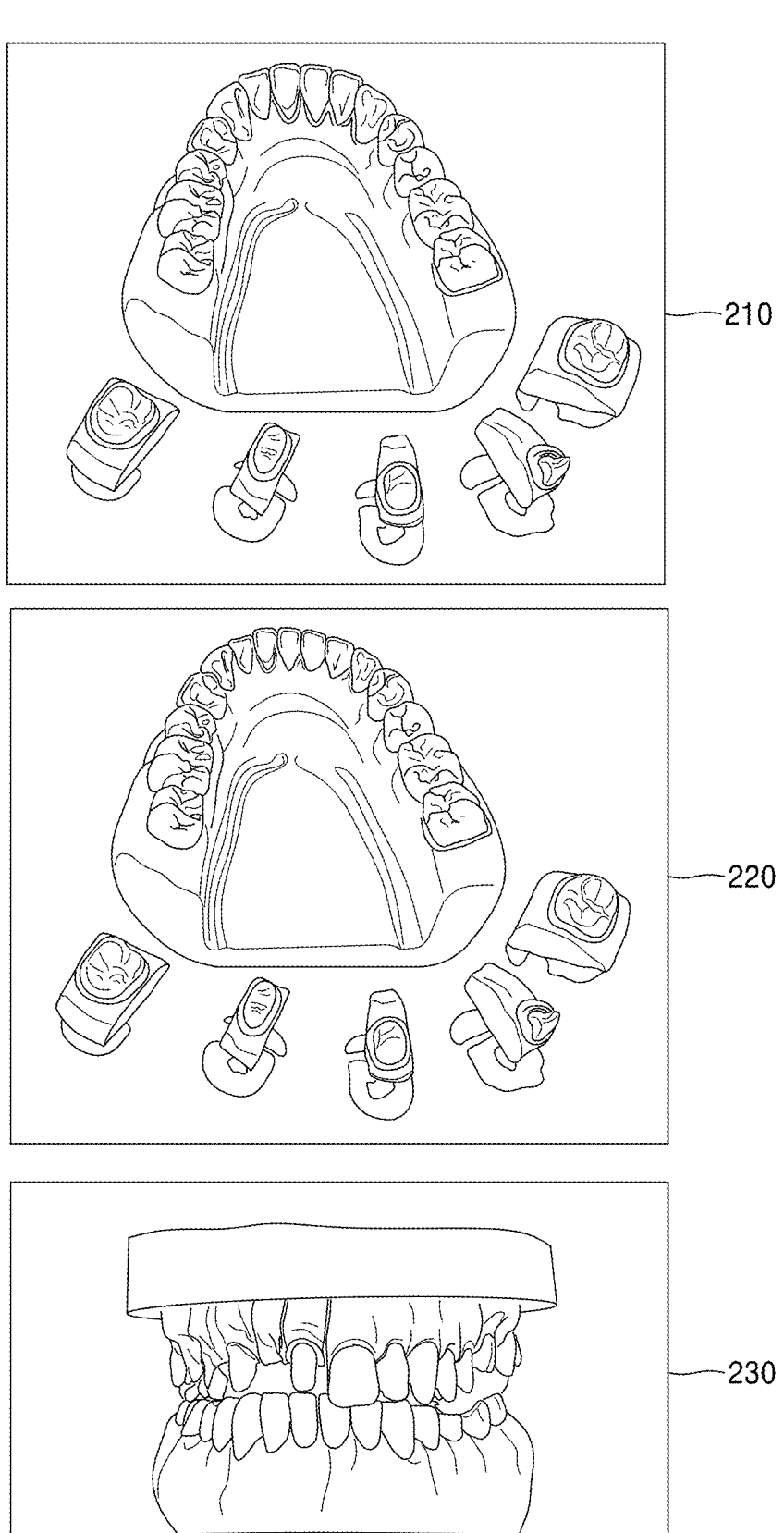
FIG. 2 is a view for explaining a method by which a 3D scanner scans an abutment model together with a base model, according to an embodiment.
Figure 3:
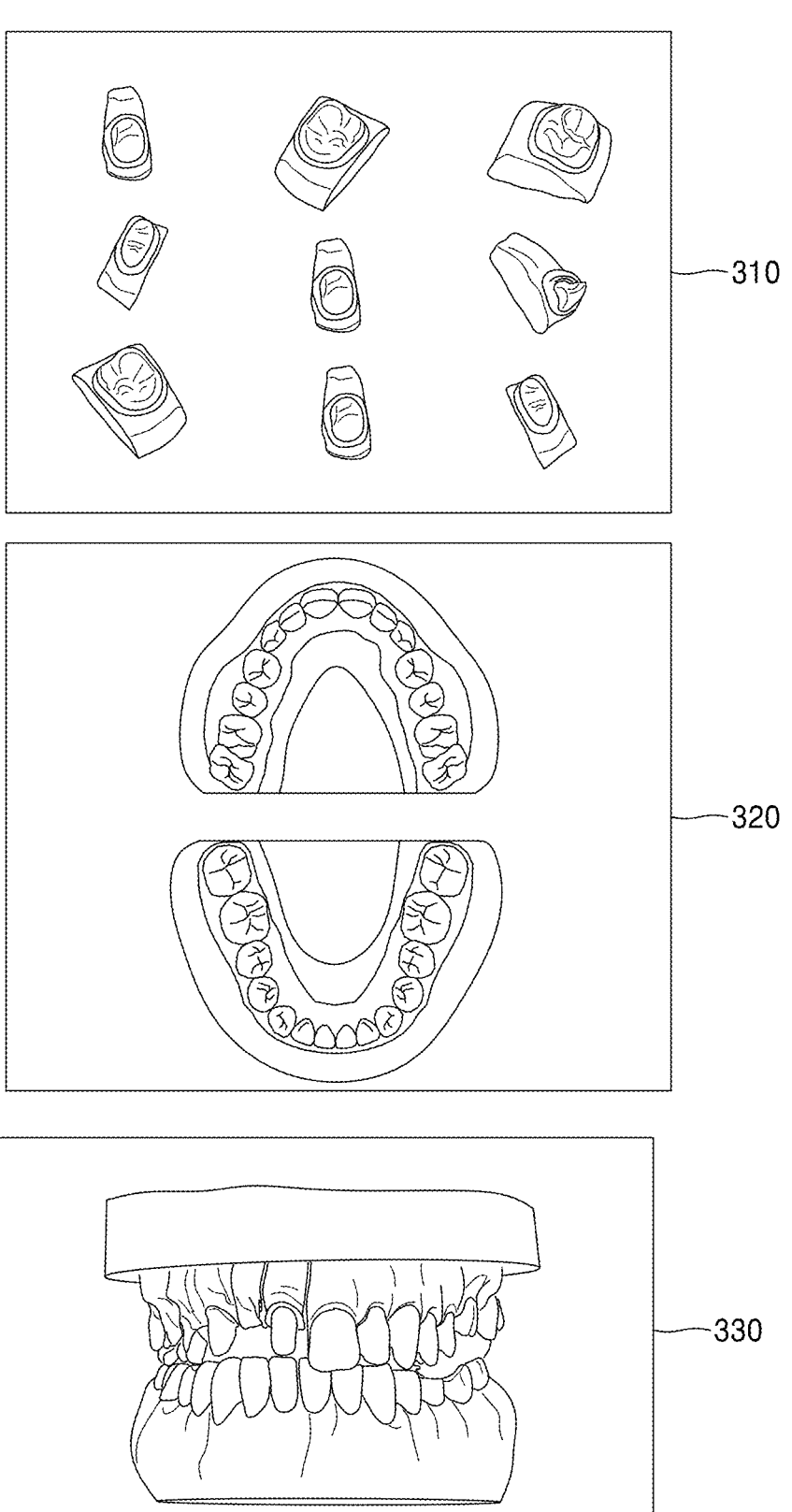
FIG. 3 is a view for explaining a method by which the 3D scanner scans two base models together, according to an embodiment.
Figure 4:
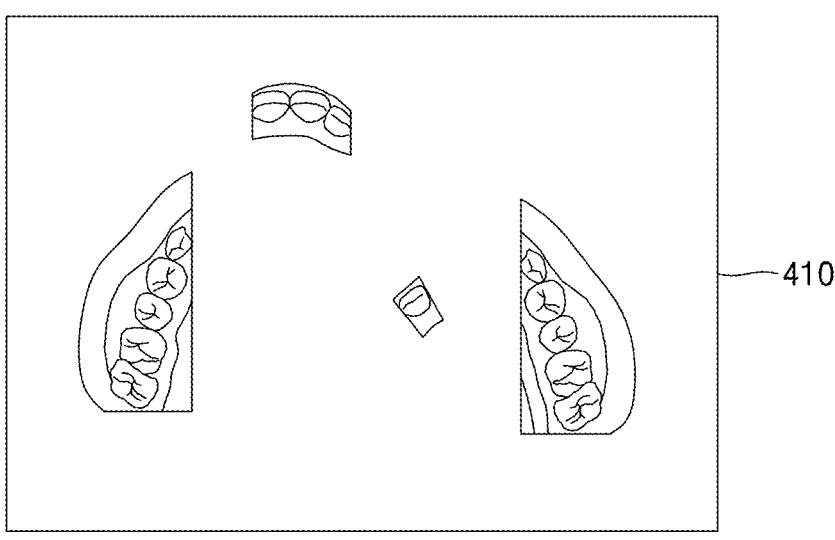
FIG. 4 is a view for explaining a method by which the 3D scanner scans two base models and an abutment model together, according to an embodiment.
Figure 4:
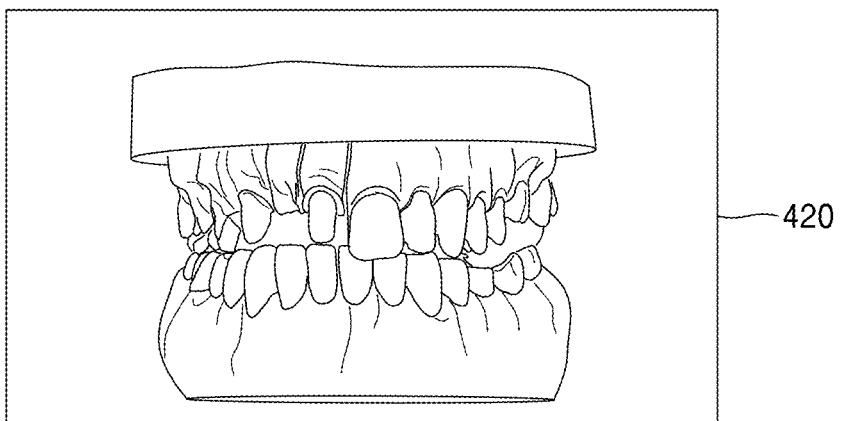

FIGS. 2 to 4 are views for explaining a method of obtaining a multiple model image by scanning two or more models together, according to an embodiment.

The 3D scanner may scan two or more of the maxillary base model, the mandibular base model, and the abutment model together.

When one or several teeth are lost, treatment is applied to restore a lost region with a fixed prosthetic appliance, such as a crown or bridge. When the fixed prosthetic appliance is impossible to use or not aesthetically pleasing, a tooth missing region may be restored with a removable partial denture referred to as a partial denture. As described above, the abutment may refer to a tooth that supports the prosthetic appliance during a treatment planning stage before fixed or removable prosthetic treatment.

A user, such as a dentist, may obtain abutments, that is, preparation teeth, by trimming the teeth to secure a space to be covered by the prosthetic appliance. The user may obtain a plaster model of the maxilla or mandible including preparation teeth. When margin lines of the preparation teeth are hidden inside the gums, the margin lines of the preparation teeth are not displayed on the plaster model. The margin line of the abutment is required to manufacture a prosthetic appliance. Therefore, the user saws and separates a preparation tooth region from the plaster model and trims the separated region to remove a portion corresponding to the gum. Accordingly, the abutment model including the margin lines may be obtained. The abutment model is separated from the plaster model of the maxilla or mandible including the preparation teeth and may be thus detachably coupled to the maxillary base model or mandibular base model. When there are no teeth to support the prosthetic appliance, artificial structures that replace teeth, for example, metal abutments such as implants, may be used as the abutments.

In an embodiment, the abutment model may include a model including margin lines obtained for the abutments. Additionally/alternatively, in an embodiment, the abutment model may include a model for an artificial structure, such as an implant, which replaces a tooth.

The abutment model may include at least one of a maxillary abutment model separable from the maxillary base model and a mandibular abutment model separable from the mandibular base model. The maxillary abutment model may include a model for the abutment on the same side as the maxillary base model, that is, the abutment belonging to the maxilla, and the mandibular abutment model may include a model for the abutment on the same side as the mandibular base model, that is, the abutment belonging to the mandible.

Hereinafter, for convenience of description, a base model, to which the abutment model is coupled, is referred to as a abutment-coupled base model. For example, the abutment-coupled base model may refer to a maxillary base model into which the maxillary abutment model is inserted or a mandibular base model into which the mandibular abutment model is inserted. In addition, a base model, from which the abutment model is separated, is referred to as an abutment-separated base model. For example, the abutment-separated base model may refer to a maxillary base model from which the maxillary abutment model is separated or a mandibular base model from which the mandibular abutment model is separated.

In an embodiment, the 3D scanner may obtain 2D image data by scanning two or more models together. The 3D scanner and/or data processing device may generate a 3D oral image three-dimensionally representing the oral cavity, on the basis of the 2D image data. In an embodiment, the 3D oral image generated based on the 2D image data obtained by scanning two or more models may include a multiple model image. In an embodiment, the multiple model image may be a 3D oral image obtained by scanning two or more of the maxillary base model, the mandibular base model, and the abutment model together, and may include two or more model images.

In an embodiment, the 3D scanner may scan at least one of the maxillary base model and the mandibular base model together with the abutment model.

In an embodiment, when the 3D scanner scans the base model and the abutment model together, it is desirable to perform the scan with the abutment model placed on the rear side of the base model. When the scanning is performed with the abutment model placed on the lateral side or front side of the base model, a partial region of at least one of the base model and the abutment model is obscured. Accordingly, it may be difficult to obtain accurate reference data for the model. Therefore, the 3D scanner performs a scan with the abutment model placed on the rear side of the base model so that no part is obscured by the base model and the abutment model overlapping each other. Accordingly, a larger amount of reference data may be obtained. The reference data for the object may refer to surface data of the object obtained through scanning. The reference data may be used to align regions that match each other in the image.

In an embodiment, the 3D scanner may scan the abutment model together with a corresponding base model. The corresponding base model may refer to a base model on the opposite side to the abutment model, not a base model on the same side as the abutment model, among the maxillary base model and the mandibular base model. For example, the 3D scanner may scan the maxillary abutment model together with the mandibular base model and/or scan the mandibular abutment model together with the maxillary base model. The base model needs to be scanned in a state in which the abutment model is inserted into the base model, and the abutment model needs to be scanned in a state in which the abutment model is separated from the base model. Accordingly, it is possible to obtain more reference data about the object.

Hereinafter, the 3D oral image obtained based on the 2D image data generated by the 3D scanner is described with reference to FIG. 2.

FIG. 2 is a view for explaining a method by which a 3D scanner scans an abutment model together with a base model, according to an embodiment.

A first image 210 in FIG. 2 shows a multiple model image generated based on 2D image data obtained by scanning the maxillary abutment model together with the mandibular base model using the 3D scanner. When a mandibular abutment model exists, the 3D scanner may scan the abutment-coupled base model in which the mandibular abutment model is inserted into the mandibular base model.

A second image 220 shows a multiple model image generated based on 2D image data obtained by scanning the mandibular abutment model together with the maxillary base model using the 3D scanner. When a maxillary abutment model exists, the 3D scanner scans the maxillary base model into which the maxillary abutment model is inserted, that is, the abutment-coupled base model. Accordingly, the 2D image data for obtaining the second image 220 may be generated.

The third image 230 shows an occlusal model image generated based on 2D image data for an occlusal model obtained by the 3D scanner. The occlusal model may include a model created by occluding the maxillary base model and the mandibular base model with the abutment inserted.

As described above, according to the embodiment, the 3D scanner scans a plurality of models together rather than performing a separate scan for each model, and thus, the time required for scanning may be reduced. Also, users, such as dentists, do not need to change objects to be scanned multiple times when scanning the objects, and thus, it is possible to obtain scan data more easily.

In an embodiment, the 3D scanner and/or data processing device may obtain the 3D oral model by aligning overlapping regions using the first image 210, the second image 220, and the third image 230.

The 3D scanner and/or data processing device may identify whether the models belonging to the first image 210 to the third image 230 are the maxillary base model, the mandibular base model, the abutment model, or the occlusal model.

In an embodiment, the 3D scanner and/or data processing device may receive object identification information from a user using a neural network or through a user interface. Also, the 3D scanner and/or data processing device may identify an object according to the position information of the object, using the position information of the object on the tray. Also, the 3D scanner and/or the data processing device may recognize object identification information displayed on the object by the user and identify the object therefrom.

In an embodiment, the 3D scanner and/or data processing device may identify which object the models belonging to the first image 210 to the third image 230 are and may then identify whether to align the abutment model image to the base model image first or to the occlusal model image first. However, this is only one embodiment, and the 3D scanner and/or data processing device aligns matching model images and may then identify which object the model belonging to the aligned image is.

In an embodiment, the 3D scanner and/or data processing device aligns overlapping regions in the maxillary abutment model image belonging to the first image 210 and the maxillary base model image belonging to the second image 220 and may obtain an image in which the maxillary abutment model is aligned to the maxillary base model. Likewise, the 3D scanner and/or data processing device identifies overlapping region in the mandibular abutment model image belonging to the second image 220 and the mandibular base model image belonging to the first image 210 and may obtain an image in which the mandibular abutment model is aligned. That is, the 3D scanner and/or data processing device may first align the abutment model image to the base model image, rather than to the third image 230, that is, the occlusal model image. This is because the occlusal model image only contains information about the buccal side of the occlusal model. The occlusal model image has less reference data for aligning the image than the base model image, which has information in various directions, such as the lingual, distal, and mesial sides as well as the buccal side. Accordingly, it may be more accurate to align the abutment model image to the base model image, which has more reference data than the occlusal model image.

The 3D scanner and/or data processing device may align the maxillary base model image, to which the maxillary abutment model is aligned, and the mandibular base model image, to which the mandibular abutment model is aligned, to the occlusal model image, that is, the third image 230, to thereby obtain the 3D oral cavity model.

In the above, a case is described in which the 3D scanner scans the abutment model together with the base model opposite to the abutment model, that is, the corresponding base model, but the embodiment is not limited thereto. In another embodiment, the 3D scanner may scan the base model, from which an abutment has been separated, and the abutment together. For example, the 3D scanner may scan the maxillary abutment model together with the maxillary base model from which the maxillary abutment has been separated and may also scan the mandibular abutment model together with the mandibular base model from which the mandibular abutment has been separated.

In an embodiment, the 3D scanner and/or data processing device may identify which object the models belonging to the first image 210 and the second image 220 are and may then identify whether to align the abutment model image to the base model image first or to the occlusal model image first. Also, in another embodiment, the 3D scanner and/or data processing device aligns the abutment model image to the base model image or occlusal model image and may then identify which object the models belonging to the first image 210 and the second image 220 are.

In an embodiment, the 3D scanner and/or data processing device may determine, from the base model image, whether the base model is in a state in which artificial structures, such as implants or orthodontic devices, are required. For example, the 3D scanner and/or data processing device may determine, from the image of the object, whether the base model is in a normal shape or in a state in which abutments are required, using a neural network that has learned the image of the base model in the normal shape and the image of the base model in the form in which artificial structures/abutments are required.

The 3D scanner and/or data processing device may first align the base model image to the occlusal model image, when it is determined that the base model requires an abutment. The 3D scanner and/or data processing device may determine that there is no reference data for aligning the abutment model image to the base model image because the scan has been performed on the base model in a state without the abutment model, that is, on the abutment-separated base model, and may thus first align the base model image to the occlusal model image.

When the abutment is scanned with the abutment-separated base model, for example, when the maxillary abutment model is scanned with the maxillary base model from which the maxillary abutment has been separated and the mandibular abutment model is scanned with the mandibular base model from which the mandibular abutment has been separated, the 3D scanner and/or data processing device may determine, from the base model image, that the corresponding base model requires the abutment and may thus first align the abutment-separated base model to the occlusal model image. Unlike the base model image, the occlusal model image is a model in which the maxillary base model and the mandibular base model are occluded in a state of the abutment-coupled base model, that is, in a state in which the abutment model image is inserted, and thus, the occlusal model image includes reference data that may be referenced by the abutment model image.

The 3D scanner and/or data processing device may align the abutment model image to the occlusal model image and then align overlapping regions using the maxillary base model image and the mandibular base model image, thereby obtaining the 3D oral cavity model. However, as described above, the occlusal model image only includes information about the appearance of the occlusal model, and thus, it may be more desirable to first align the base model image to the occlusal model image and then align the abutment model thereto.

FIG. 3 is a view for explaining a method by which the 3D scanner scans two base models together, according to an embodiment.

Referring to FIG. 3, a first image 310 shows a 3D oral image obtained by scanning a plurality of abutment models together with the 3D scanner. The abutment models may include at least one of a maxillary abutment model and a mandibular abutment model. The first image 310 may include a multiple model image that includes images of the plurality of abutment models.

A second image 320 shows a 3D oral image generated by scanning the maxillary base model and the mandibular base model together with the 3D scanner. The maxillary base model and the mandibular base model may include the abutment-coupled base models in which the maxillary abutment model and the mandibular abutment model are respectively inserted. The second image 320 may include a multiple model image that includes the maxillary base model image and the mandibular base model image.

A third image 330 is a 3D oral image obtained by scanning the occlusal model with the 3D scanner and shows the occlusal model image. The occlusal model may include a model created by occluding the maxillary base model and the mandibular base model with the abutment model inserted.

In an embodiment, the 3D scanner and/or data processing device may identify whether the models belonging to the first image 310 to the third image 330 are the maxillary base model, the mandibular base model, the abutment model, or the occlusal model.

In an embodiment, the 3D scanner and/or data processing device may identify which object the models belonging to the first image 310 to the third image 330 are and may then identify whether to align the abutment model image to the base model image first or to the occlusal model image first.

For example, the 3D scanner and/or data processing device may determine, from the image of the object, whether the base model is in a normal shape or in a state in which abutments are required, using a neural network that has learned the image of the base model in the normal shape and the image of the base model in the form in which artificial structures/abutments are required.

In the above example, the 3D scanner and/or data processing device may first align the abutment model image to the base model image, rather than to the occlusal model image. The 3D scanner and/or data processing device may align the abutment model image to the occlusal model image when the abutment model image is not aligned to the base model image.

In an embodiment, the 3D scanner and/or data processing device may perform matching by finding regions that overlap with the abutment model image belonging to the first image 310 in the maxillary base model image and the mandibular base model image belonging to the second image 320. Accordingly, the maxillary abutment model may be aligned to the maxillary base model and the mandibular abutment model may be aligned to the mandibular base model. Subsequently, the 3D scanner and/or data processing device may align the maxillary base model image, to which the maxillary abutment model is aligned, and the mandibular base model image, to which the mandibular abutment model is aligned, to the occlusal model image, to thereby obtain the 3D oral cavity model.

FIG. 4 is a view for explaining a method by which the 3D scanner scans two base models and an abutment model together, according to an embodiment.

Referring to FIG. 4, a first image 410 shows a multiple model image obtained by scanning the maxillary base model, the mandibular base model, and the plurality of abutment models together with the 3D scanner.

A second image 420 shows a 3D occlusal model image obtained by scanning the occlusal model with the 3D scanner. The occlusal model may include a model created by occluding the maxillary base model and the mandibular base model with the abutment model inserted.

In an embodiment, the 3D scanner and/or data processing device may identify whether the models belonging to the first image 410 and the second image 420 are the maxillary base model, the mandibular base model, the abutment model, or the occlusal model.

In an embodiment, the 3D scanner and/or data processing device may identify which object the models belonging to the first image 410 and the second image 420 are and may then identify which model image among the base model image and the occlusal model image is aligned first to the abutment model image.

In FIG. 4, the base model and the abutment model on the same side inserted into the base model are scanned together, and thus, the 3D scanner and/or data processing device may first align the abutment model image to the occlusal model image. Subsequently, the 3D scanner and/or data processing device may align the maxillary base model image and the mandibular base model image to the occlusal model image to which the abutment model image is aligned. However, this is only one embodiment, and the 3D scanner and/or data processing device may first align the maxillary base model image and the mandibular base model image to the occlusal model image and then align the abutment model image to the aligned image.

Figure 5:
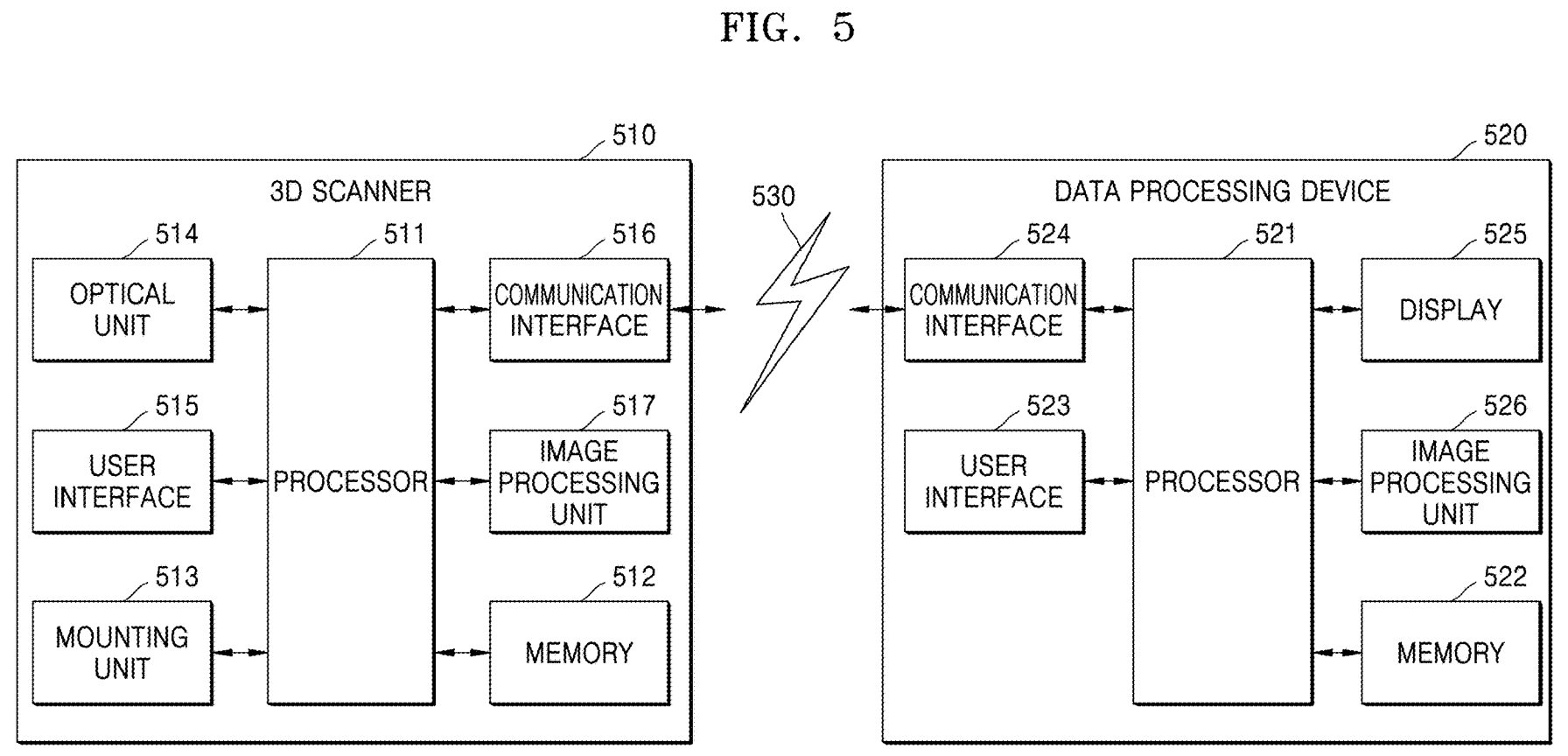

FIG. 5 is an example of a detailed block diagram of an oral image processing system including a 3D scanner and a data processing device.

In an embodiment, the oral image processing system may include a 3D scanner 510, a data processing device 520, and a communication network 530.

The 3D scanner 510 may transmit raw data, obtained by scanning the oral cavity or a tooth cast model of a patient, to the data processing device 520 via the communication network 530 or may process the raw data to create a 3D virtual model and transmit the same to the data processing device 520.

The 3D scanner 510 may include a processor 511, memory 512, a mounting unit 513, an optical unit 514, a user interface 515, a communication interface 516, and an image processing unit 517.

The memory 512 may store at least one instruction. The memory 512 may store at least one instruction or at least one program executed by the processor. Also, the memory 512 may temporarily store 2D image data obtained by a camera or a 3D virtual model generated therefrom and transmit the same to the data processing device 520.

The mounting unit 513 may be a place on which an object to be scanned is located and may include an inner space belonging to the housing and a tray located in the inner space. In addition, the mounting unit 513 may include a rotating part for rotating the tray or a moving part for moving the position of the tray and may thus rotate or move the tray.

In an embodiment, the mounting unit 513 may hold two or more of a maxillary base model, a mandibular base model, and an abutment model. For example, the mounting unit 513 may hold the maxillary base model and the mandibular base model together, and thus, the optical unit 514 may scan the maxillary base model and the mandibular base model together. Here, the maxillary base model and the mandibular base model may be scanned in a state in which the rear sides thereof face each other.

In an embodiment, the mounting unit 513 may hold the abutment model and at least one of the maxillary base model and the mandibular base model together. Here, the mounting unit 513 may allow scanning to be performed in a state in which the abutment model is located on the rear side of the base model. Also, the mounting unit 513 may hold an occlusal model having a shape in which the maxillary base model and the mandibular base model are occluded.

In an embodiment, a scan region may be marked on the tray belonging to the mounting unit 513.

The user interface 515 may receive a user input for controlling the 3D scanner 510. The user interface 515 may include a touch panel for sensing a touch of a user, a button for receiving a push operation of a user, a voice recognition device including a microphone, or the like.

The optical unit 514 may include a light source, a light emitting part for emitting light from the light source, and at least one camera for receiving light reflected from the object. The optical unit 514 may project pattern light, structured light, or the like. The optical unit 514 may emit light using an RGB light source and form patterns by controlling each of the fine mirrors belonging to the DMD. The optical unit 514 may emit light by controlling turning on or off of the mirrors belonging to the DMD.

In an embodiment, the 2D image data may be obtained using the optical unit 514.

The communication interface 516 may communicate with the data processing device 520 via a wired or wireless communication network 530. Specifically, the communication interface 516 may communicate with the data processing device 520 under the control of the processor 511. The communication interface 516 may transmit the 2D image data obtained by the image processing unit 517 to the data processing device 520.

The communication interface 516 may include at least one short-distance communication module, which performs communication according to communication standards, such as Bluetooth, Wi-Fi, Bluetooth low energy (BLE), near field communication/radio frequency identification (NFC/RFID), Wifi direct, Ultra-wideband (UWB), or ZigBee, a long-distance communication module, which communicates with a server for supporting long-distance communication according to long-distance communication standards, and at least one port, which is connected to the external electronic device via a wired cable in order to communicate by wire.

In an embodiment, when the processor 511 identifies an object placed on the mounting unit 513 or identifies object identification information from an image of the object using a neural network or receives identification information about the object from a user via the user interface 515, the communication interface 516 may transmit the object identification information to the data processing device 520 via the communication network 530.

Also, when the object placed on the mounting unit 513 is out of the certain scan range, the communication interface 516 may transmit a state, in which the object is out of the scan range, to the data processing device 520 via the communication network 530.

The image processing unit 517 may perform operations for generating and/or processing images. The image processing unit 517 may perform processing operations for data transmission or the like on the raw data including L image data and R image data acquired from the optical unit 514 and may output to the communication interface 516 for transmission to the data processing device 520. In addition, the image processing unit 517 may directly process the raw data including the L image data and the R image data to generate a 3D virtual model and transmit the same to the data processing device 520 via the communication interface 516.

The processor 511 may control the 3D scanner 510 overall.

In an embodiment, the processor 511 may receive control information from the data processing device 520 and control the 3D scanner 510 according to the control information.

In an embodiment, when the image processing unit 517 directly processes the raw data including the L image data and the R image data to generate a 3D image, the processor 511 may identify which object the model belonging to the 3D oral image is.

Hereinafter, the data processing device 520 is described below. The data processing device 520 may also be referred to as an oral image processing device.

The data processing device 520 may include a communication interface 524, a user interface 523, a display 525, an image processing unit 526, memory 522, and a processor 521.

The communication interface 524 may communicate with at least one external electronic device via a wired or wireless communication network. The communication interface 524 may communicate with the 3D scanner 510 under the control of the processor 521.

Specifically, the communication interface 524 may include at least one short-distance communication module, which performs communication according to communication standards, such as Bluetooth, Wi-Fi, BLE, NFC/RFID, Wifi direct, UWB, or ZigBee. Also, the communication interface 524 may further include a long-distance communication module, which communicates with a server for supporting long-distance communication according to long-distance communication standards.

Also, the communication interface 524 may include at least one port (e.g., the 3D scanner 510), which is connected to the external electronic device via a wired cable.

In an embodiment, the communication interface 524 may receive the 2D image data from the 3D scanner 510 or receive the 3D oral image. In an embodiment, the communication interface 524 may receive object identification information from the 3D scanner 510. Also, the communication interface 524 may transmit control information to the 3D scanner 510.

The user interface 523 may receive a user input for controlling the data processing device 520. The user interface 523 may include user input devices, such as a touch panel for sensing a touch of a user, a button for receiving a push operation from a user, and a mouse or keyboard for designating or selecting a point on a user interface screen and may include a voice recognition device for recognizing voice.

In an embodiment, the user interface 523 may receive selection or input of object identification information, representing the object to be currently scanned, from a user, such as a dentist. The object identification information may refer to information for identifying which part of the oral cavity the object is. For example, the identification information about the object may include information that identifies whether the object is the maxillary base model, the mandibular base model, or the abutment model inserted into the maxillary base model or the mandibular base model.

The display 525 may display a certain screen under the control of the processor 521. The display 525 may display a user interface screen including an oral image generated on the basis of data obtained by scanning the oral cavity of a patient or a plaster model of the oral cavity in the 3D scanner 510 and may display the object identification information together with the oral image. Also, the display 525 may display a user interface screen that includes information about the dental treatment of a patient.

In an embodiment, the display 525 may output the 3D oral model which is generated from the 2D image data received from the 3D scanner 510.

The image processing unit 526 may perform operations for generating and/or processing images. Specifically, the image processing unit 526 may receive raw data obtained from the 3D scanner 510 and generate a 3D virtual model on the basis of the received data.

The memory 522 may store at least one instruction. Also, the memory 522 may store at least one instruction executed by the processor. Also, the memory may store at least one program executed by the processor 521. Also, the memory 522 may store data (e.g., raw data obtained by scanning the oral cavity, etc.), which is received from the 3D scanner 510. Also, the memory may store the oral image three-dimensionally representing the oral cavity. According to an embodiment, the memory 522 may include one or more instructions for obtaining a 3D oral model from 2D image data.

The processor 521 executes at least one instruction stored in the memory 522 and performs control so that the intended operation is carried out. Here, at least one instruction may be stored in an internal memory included in the processor 521 or in the memory 522 included in a data processing device separated from the processor 521.

In an embodiment, the processor 521 may generate a 3D oral image three-dimensionally representing the oral cavity on the basis of the 2D image data received from the 3D scanner 510.

In an embodiment, the processor 521 may execute one or more instructions stored in the memory 522 and directly identify the object being scanned in the 3D image, together with the processor 511 of the 3D scanner 510 or independently of the processor 511 of the 3D scanner 510.

In an embodiment, the processor 521 may identify the object from the image of the object, using a neural network, that is, a neural network learning to identify objects from a plurality of oral images. The neural network may use learned data recognition model and identify, from the input image, whether the object is the maxillary base model, the mandibular base model, the occlusion model, or the abutment model. The neural network used in the embodiment disclosed herein may include a deep neural network (DNN). Also, the DNN may be formed as a convolution neural network (CNN).

In an embodiment, the processor 521 may receive the object identification information about what the object is from a user via the user interface 523. The processor 521 may store the input object identification information together with the 3D image of the object or may store the input object identification information as additional information to the 3D image.

In an embodiment, the processor 521 may use a tray including the location information of the object to identify the object according to the location information of the object. For example, the tray belonging to the mounting unit 513 may include location information of the object. That is, the positions, at which the maxillary base model, the mandibular base model, the maxillary abutment model, and the mandibular abutment model are arranged, may be designated on the tray. A user may arrange the corresponding models at designated locations on the tray and scan the plurality of models together. The processor 521 may identify the location of the tray belonging to the image and identify the type of object arranged at that location.

In an embodiment, a user may write object identification information on the object to be scanned and scan the object on which the object identification information is written. For example, for the maxillary base model, the user may cut the plaster model of the maxillary base model along the outline corresponding to a letter U, which is identification information, so that the letter U is input onto the maxillary base model. Subsequently, the processor 521 may recognize the letter U, which is the identification information, from the image of the maxillary base model and may identify the object as the maxillary base model according to the letter U, which is the recognized identification information.

In an embodiment, when the identified object includes the abutment model and at least one of the maxillary base model and the mandibular base model, the processor 521 may identify whether the abutment model is located on the rear side of the base model. For example, when the identified object includes the base model and the abutment model, the processor 521 may determine, from the image of the object, whether the abutment model is located near the rear side rather than the front side of the base model, using a neural network that has learned where parts of the object are.

In an embodiment, the processor 521 may identify whether to align the abutment model image first to the base model image or align the abutment model image first to the occlusal model image.

For example, the processor 521 may first align the abutment model image to the base model image, and if alignment is not possible, the processor 521 may align the abutment model image to the occlusal model image.

Also, the processor 521 may determine, from the image of the object, whether the base model is in a normal shape or in a state in which abutments are required, using a neural network that has learned the image of the base model in the normal shape and the image of the base model in the form in which artificial structures/abutments are required. When the base model is in the normal shape, the processor 521 may first align the base model image to the abutment model image and then align the same to the occlusal model image, thereby creating the 3D oral model.

When the base model is not in the normal shape, the processor 521 may align the base model image to the occlusal model image. Subsequently, the processor 521 may align the abutment model image to the aligned images to thereby create the 3D oral model.

Alternatively, the processor 521 may first align the abutment model image to the occlusal model image and then align the base model image to the aligned images.

According to an embodiment, the feature, in which the processor 521 performs operations such as 'extracting,' 'obtaining,' and 'generating' may include not only directly performing the above-described operations by executing at least one instruction in the processor 521, but also controlling other components so that the above operations are performed.

In order to practice the embodiments disclosed herein, the 3D scanner 510 and the data processing device 520 may include only some of the components shown in FIG. 5 or may include more components in addition to the components shown in FIG. 5.

Also, the data processing device 520 may store and execute dedicated software that is linked to the 3D scanner 510. Here, the dedicated software may be referred to as a dedicated program, dedicated tool, or dedicated application. When the data processing device 520 operates in conjunction with the 3D scanner 510, the dedicated software stored in the data processing device 520 may be connected to the 3D scanner 510 and receive, in real time, data obtained by scanning the oral cavity.

Also, the dedicated software may perform at least one operation to obtain, process, store, and/or transmit the oral image. Here, the dedicated software may be stored in the processor. Also, the dedicated software may provide a user interface for using data obtained from the 3D scanner. Here, the user interface screen provided by the dedicated software may include the oral image created according to the embodiment disclosed herein.

Figure 6:
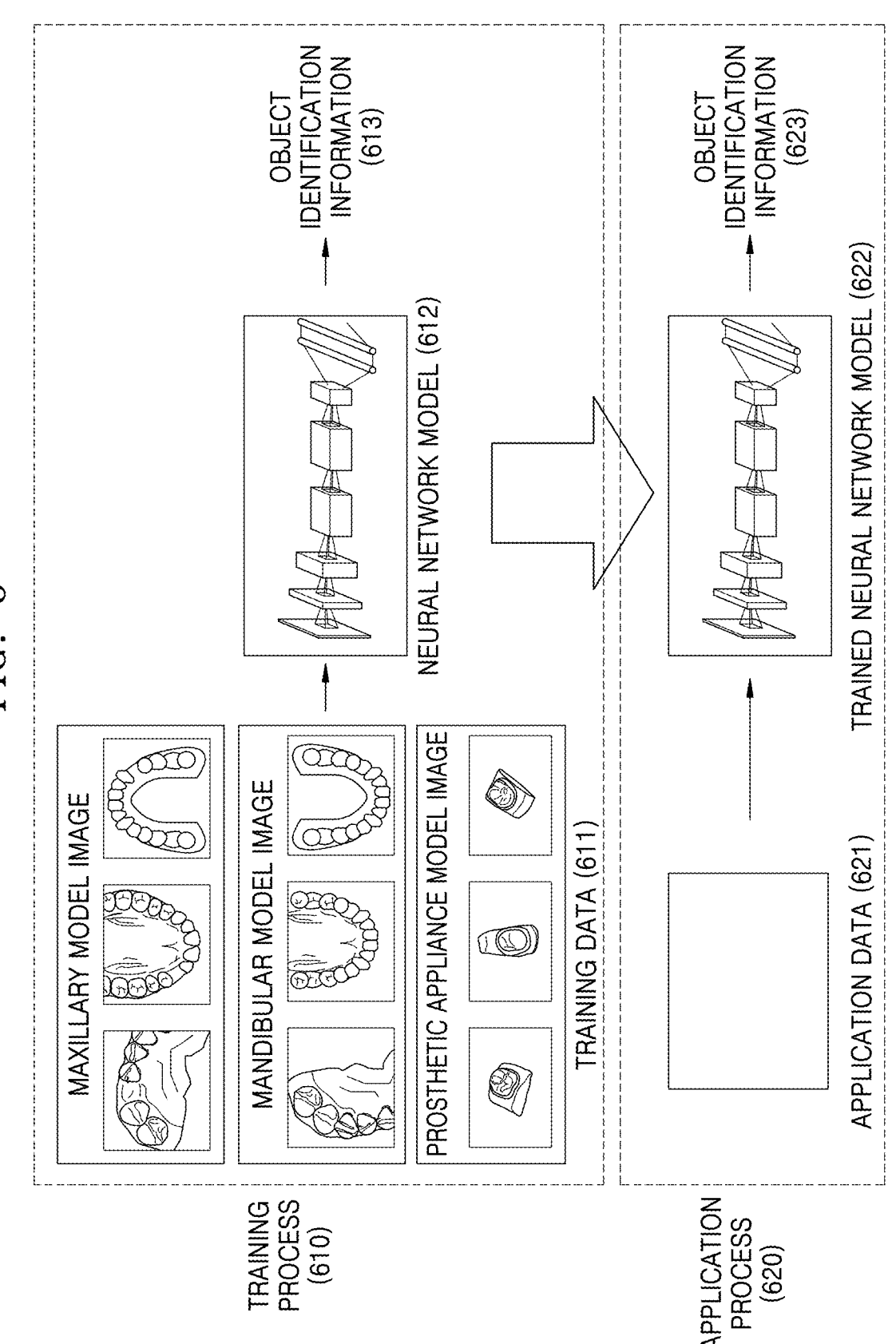
FIG. 6 is a reference view for illustrating a neural network model that identifies an object in an oral image, according to an embodiment.

FIG. 6 is a reference view for illustrating a neural network model that identifies an object in an oral image, according to an embodiment.

Referring to FIG. 6, the process of identifying an object in an oral image using artificial intelligence may generally include two processes.

First, in a training process 610, a neural network model 612 may be trained using a plurality of pieces of training data 611 as input. The identification information 613 about the object, which is the result of each training, may be fed back to the neural network model and used to update weight values of the neural network model.

More specifically, the training data 611 may include a plurality of oral images. The plurality of oral images may include a maxillary base model image, a mandibular base model image, an abutment model image, an occlusal model image, etc.

The neural network model 612 may include a plurality of neural network layers. Each of the plurality of neural network layers has a plurality of weight values and perform neural network calculations by calculations between the calculation results of the previous layer and the plurality of weight values. The plurality of weight values of the plurality of neural network layers may be optimized by the learning results of the artificial intelligence model. For example, the plurality of weight values may be updated so that loss or cost values obtained from the artificial intelligence model are reduced or minimized during the learning process. The artificial neural network may include a deep neural network (DNN) and, for example, may include a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like, but the embodiment is not limited to the examples described above.

Each of the training results may represent information about the object identified in the input oral image, that is, the object identification information 613, and the object identification information 613 may be used to update the weight values of the neural network model. When the neural network model 612 has been trained so that the training result exceeds a certain reliability level, this model may be used in the scanning process as a trained neural network model 622.

In an application process 620, data 621 to be applied, for example, oral images received in real time, are input to the trained neural network model 622, and object identification information 623 may be obtained from the input oral images as a result.

Figure 7:
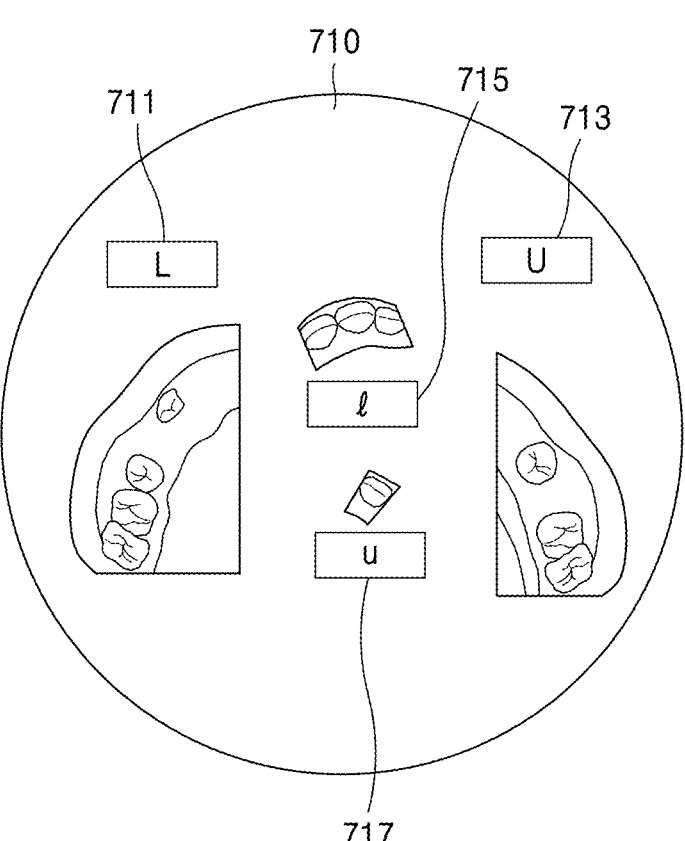
FIG. 7 is a view for explaining a method of identifying an object according to location information of the object using a tray including the location information of the object, according to an embodiment.

FIG. 7 is a view for explaining a method of identifying an object according to location information of the object using a tray including the location information of the object, according to an embodiment.

Referring to FIG. 7, a tray 710 may include location information of the object. The location information of the object may include information indicating a location at which the object should be placed.

As shown in FIG. 7, the tray 710 may include object position information 711, 713, 715, and 717 respectively indicating the positions, at which the maxillary base model, the mandibular base model, the maxillary abutment model, and the mandibular abutment model should be placed. The object position information 711, 713, 715, and 717 may be marked, for example, in regions adjacent to locations at which the objects are to be placed. The user may place models corresponding to designated positions on the tray according to the object position information 711, 713, 715, and 717 and scan the plurality of models together.

In an embodiment, the 3D scanner and/or data processing device may identify the object position information 711, 713, 715, and 717 belonging to the tray and identify the types of objects placed at those locations.

Figure 8:
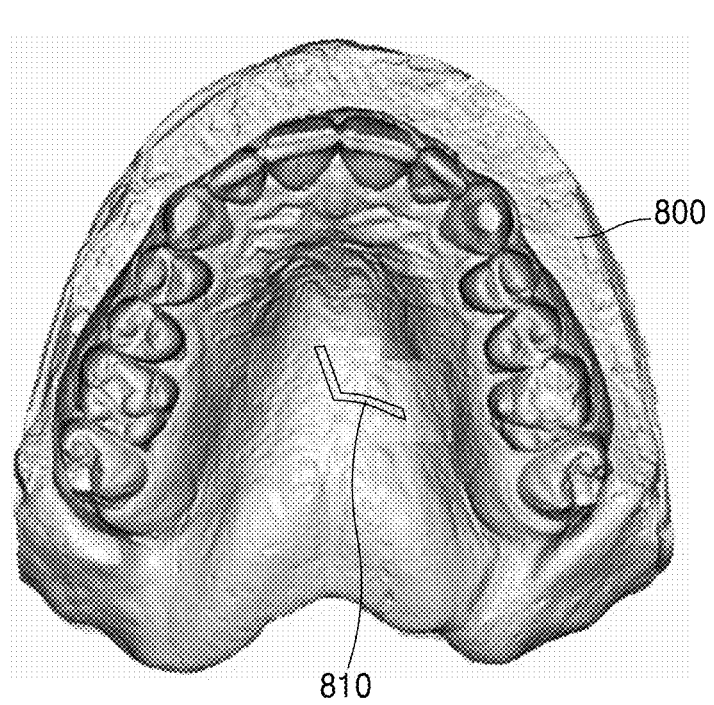
FIG. 8 is a view for explaining a method of identifying an object by writing object identification information on an object, according to an embodiment.

FIG. 8 is a view for explaining a method of identifying an object by writing object identification information on an object, according to an embodiment.

FIG. 8 shows an image obtained by imprinting an object 800 with identification information 810 and scanning the object 800 imprinted with the identification information 810. In FIG. 8, for example, the object 800 may include a mandibular base model.

The identification information 810 may include information for identifying the type of object 800 and may include at least one of a symbol, character, and image. The character may include at least one of language symbols, such as Hangul, the alphabet, and Chinese character, special characters, numbers, and punctuation marks. In addition, the identification information 810 may include at least one of a figure, an arrow, a line, a pattern, or a symbol.

For example, in order to give the letter L, which is the identification information 810, to the mandibular base model, a user may cut the mandibular base model so that the letter L, which is the identification information 810, is input on the mandibular base model, but the embodiment is not limited thereto. Subsequently, the 3D scanner and/or data processing device may recognize the identification information 810 from the image for the mandibular base model and may identify the object 800 as the mandibular base model according to the recognized identification information 810.

Figure 9:
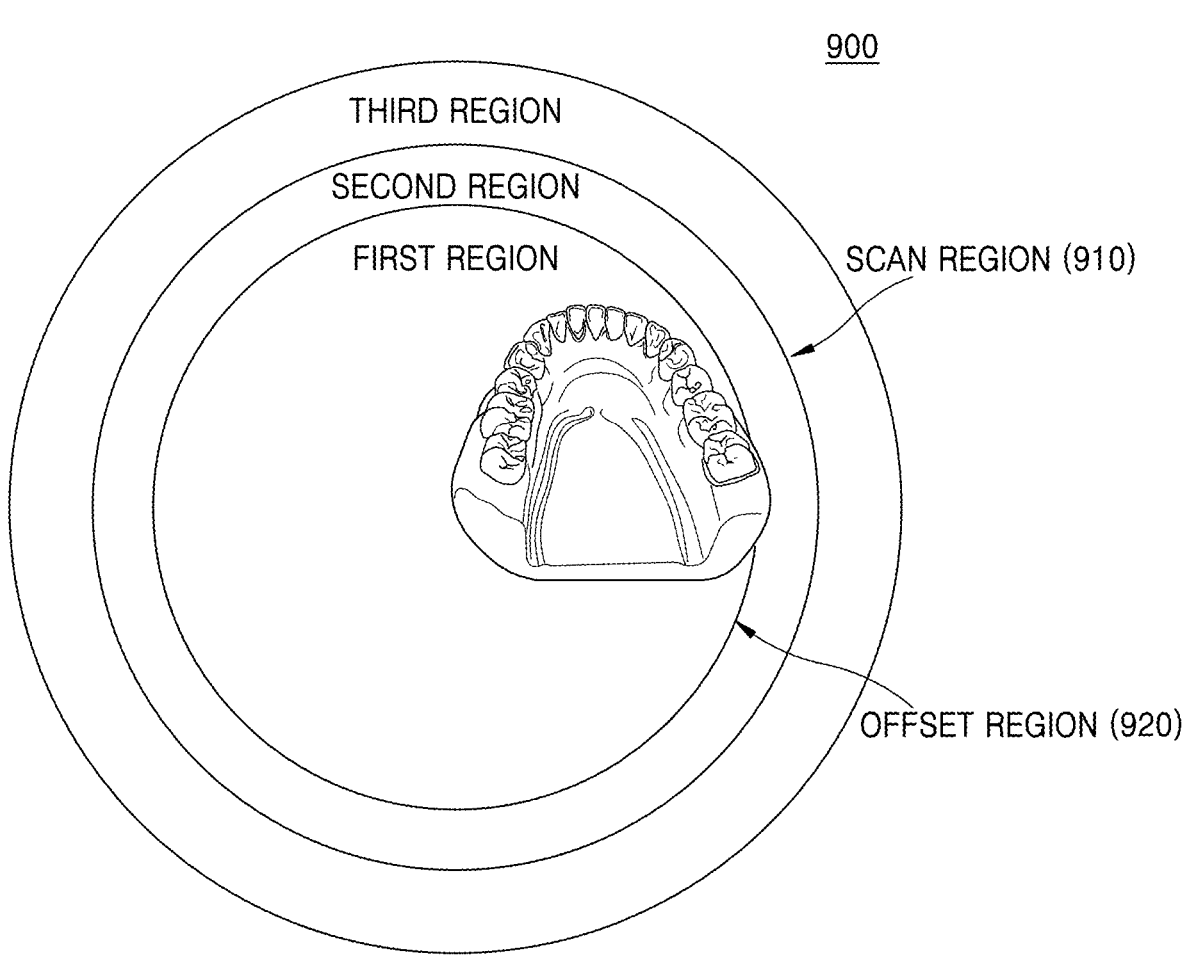
FIG. 9 is a view for explaining a method by which the 3D scanner determines whether an object is outside a scan region, according to an embodiment.

FIG. 9 is a view for explaining a method by which the 3D scanner determines whether an object is outside a scan region, according to an embodiment.

When a plurality of models are scanned together, an object may be placed outside a scan region. When an object is scanned in a state in which the object is outside the scan region, an image obtained from scan data may not include some information about the object. To prevent this, in an embodiment, the 3D scanner may recognize the scan region before starting scanning and determine whether the object is out of the scan region.

Referring to FIG. 9, a scan region 910 may be marked on a tray 900 on which the object is placed. In an embodiment, the data processing device may perceive the scan region 910 in advance. For example, the data processing device may distinguish between the scan region 910 and a region outside the scan region 910 on the basis of the image obtained and transmitted by the 3D scanner using a camera. That is, when the object is located in a first region or a second region inside the scan region 910, the image may include the object. However, when the object is located in a third region outside the scan region 910, the image may not include the object.

In an embodiment, a region located a certain distance inward from the scan region 910 may be set as an offset region 920. The data processing device may determine whether the object belongs to a region between the offset region 920 and the scan region 910, that is, the second region. For example, the data processing device may identify the region between the scan region 910 and the offset region 920 in the image on the basis of the image obtained by the camera.

In an embodiment, when it is determined that an object belongs to the second region, the data processing device may determine that there is a high possibility that the object is located in the third region outside the scan region 910.

In an embodiment, when it is determined that the object belongs to the second region and is thus outside the scan region 910, the data processing device may output a notification signal indicating this state. For example, the data processing device may output at least one notification signal among an audio signal and a video signal via speakers or displays of the data processing device. Alternatively, the data processing device may transmit a notification signal to the 3D scanner and cause the 3D scanner to output the notification signal.

Therefore, before the 3D scanner starts scanning, the data processing device determines whether the object is located outside the scan region 910. When the object is located outside the scan region 910, a user is made aware of this state in advance. Accordingly, the object may be prevented from being scanned at a wrong location.

Figure 10:
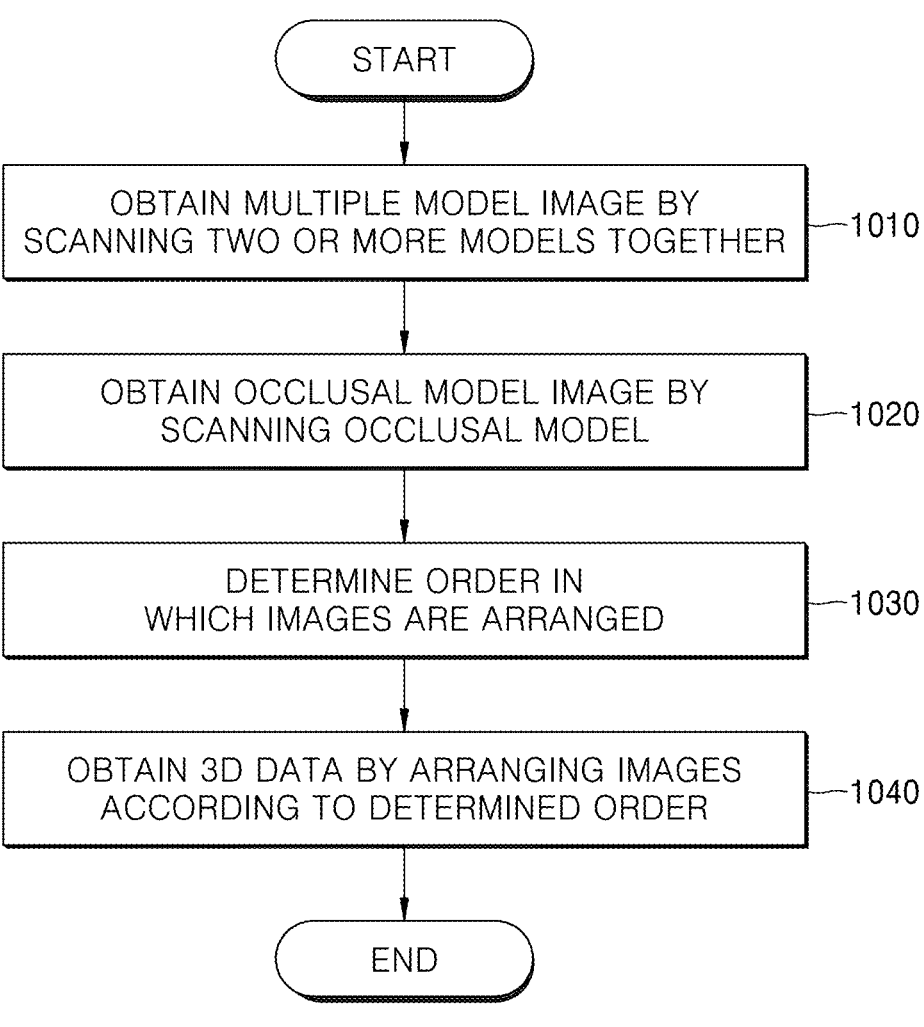
FIG. 10 is a flowchart illustrating an oral image processing method according to an embodiment.

FIG. 10 is a flowchart illustrating an oral image processing method according to an embodiment.

Referring to FIG. 10, an oral image processing system may obtain a multiple model image by scanning two or more models together (operation 1010).

The oral image processing system may obtain raw data by scanning two or more of the maxillary base model, the mandibular base model, and the abutment model together and may generate a 3D oral image on the basis of the raw data.

The oral image processing system may obtain an occlusal model image by scanning the occlusal model (operation 1020).

The oral image processing system may determine the order in which the models in the images are to be arranged, on the basis of the images of the plurality models and the occlusal model image (operation 1030).

To this end, the oral image processing system may identify the object from the image. The object identification information may be input using a neural network or from a user via a user interface. Also, the oral image processing system may identify an object according to the position information of the object, using the position information of the object on the tray. Alternatively, the object may be identified by the oral image processing system that recognizes the object identification information marked on the object by a user.

The oral image processing system may identify which object the model in the image is and then determine the order in which the models in the image are to be arranged.

The oral image processing system may obtain 3D data by arranging images according to the determined order (operation 1040).

For example, the oral image processing system may first align the abutment model image to the base model image, and if alignment is not possible, the oral image processing system may align the abutment model image to the occlusal model image.

Alternatively, the oral image processing system may distinguish between an image of a base model in a normal shape and an image of a base model that requires an artificial structure/abutment. When the base model in the image is in the normal shape, the base model image is first aligned to the abutment model image and then aligned to the occlusal model image to thereby create a 3D oral model.

When the base model is not in a normal shape, the oral image processing system may first align the base model image to the occlusal model image and then align the abutment model image to thereby create the 3D oral model.

An oral image processing method according to an embodiment of the present disclosure may be provided in the form of program instructions that may be executed by various computer devices and recorded on a computer-readable medium. Also, an embodiment of the present disclosure may include a computer-readable storage medium on which one or more programs including at least one instruction for executing the oral image processing method are recorded.

Also, the oral image processing method according to an embodiment of the present disclosure described above may include scanning two or more of a maxillary base model, a mandibular base model, and an abutment model together to obtain a multiple model image, scanning an occlusal model having a shape, in which the maxillary base model and the mandibular base model are occluded, to obtain an occlusal model image, and aligning overlapping regions from the multiple model image and the occlusal model image to obtain a 3D oral model, wherein the abutment model includes at least one of the maxillary abutment model coupled to the maxillary base model and the mandibular abutment model coupled to the mandibular base model. The oral image processing method may be performed by a computer program product including a computer-readable recording medium on which a program for performing the oral image processing method is recorded.

The computer-readable storage medium may include program instructions, data files, data structures, and the like, individually or in combination. Here, examples of the computer-readable storage medium may include magnetic media, such as hard disks, floppy disks, and magnetic tapes, optical media, such as compact disc read only memory (CD-ROM) and digital versatile discs (DVD), and magneto-optical media, such as floptical disks, and hardware devices, configured to store and execute program commands, such as ROM, RAM, and flash memory.

Here, the machine-readable storage medium may be provided in the form of a non-transitory storage medium. Here, the 'non-transitory' may indicate that a storage medium is a tangible device. Also, the 'non-transitory storage medium' may include a buffer for temporarily storing data.

According to an embodiment, the oral image processing method according to various embodiments disclosed herein may be provided by being included in a computer program product. The computer program product may be distributed in the form of a machine-readable storage medium (e.g., CD-ROM). Also, the computer program product may be distributed directly or online (e.g., download or upload), through an application store (e.g., Play Store) or between two user devices (e.g., smartphones). Specifically, the computer program product according to an embodiment may include a storage medium on which a program including at least one instruction for performing the oral image processing method according to an embodiment is recorded.

Although the embodiments have been described above in detail, the scope of the present disclosure is not limited thereto. Various modifications and improvements made by those skilled in the art using the basic concept of the present disclosure as defined in the following claims also fall within the scope of the present disclosure.

The invention claimed is:

1. A method for processing an oral image, the method comprising:

scanning two or more of a maxillary base model, a mandibular base model, and an abutment model together to obtain a multiple model image;

scanning an occlusal model to obtain an occlusal model image, the occlusal model having a shape in which the maxillary base model and the mandibular base model are occluded; and aligning overlapping regions of the multiple model image and the occlusal model image with each other to obtain a three-dimensional oral model, wherein the abutment model is detachable from a base model, the base model being either the maxillary based model or the mandibular base model, wherein the obtaining the multiple model image comprises:

identifying whether the base model is an abutment-separated base model, from which the abutment model is separated, or an abutment-coupled base model, into which the abutment model is inserted, and according to whether the base model is the abutment-separated base model or the abutment-coupled base model, determining which images among a base model image, the occlusal model image, and an abutment model image are to be first aligned.

2. The method of claim 1, wherein the obtaining of the multiple model image further comprises scanning the abutment model together with an opposing base model, which is a base model disposed opposite to the abutment model, to obtain the abutment model image and a corresponding base model image.

3. The method of claim 2, wherein the obtaining of the multiple model image further comprises scanning the abutment-coupled base model to obtain an abutment-coupled base model image, and the obtaining of the three-dimensional oral model comprises aligning the abutment model image with the abutment-coupled base model image or the occlusal model image.

4. The method of claim 3, wherein the determining which images are to be first aligned comprises identifying which image between the abutment-coupled base model image and the occlusal model image is to be aligned first with the abutment model image.

5. The method of claim 1, wherein the obtaining of the multiple model image further comprises scanning the abutment model together with the abutment-separated base model from which the abutment is separated, to obtain an abutment model image and the abutment-separated base model image.

6. The method of claim 5, wherein the obtaining of the three-dimensional oral model comprises aligning the abutment model image with the occlusal model image.

7. The method of claim 1, wherein the obtaining of the multiple model image further comprises:

scanning a plurality of abutment models together to obtain an abutment model image; and scanning the base model to which the plurality of abutment models are coupled to obtain an abutment-coupled base model image, wherein the obtaining of the three-dimensional oral model comprises aligning the abutment model image with the abutment-coupled base model image or the occlusal model image.

8. The method of claim 1, further comprising identifying which model among the maxillary base model, the mandibular base model, the abutment model, and the occlusal model is an object to be scanned.

9. The method of claim 8, wherein the identifying comprises using a neural network that has been trained to identify an object from a plurality of oral images to thereby identify an object to be scanned in the multiple model image and the occlusal model image.

10. The method of claim 8, wherein the identifying further comprises:

recognizing identification information that belongs to the object to be scanned in the multiple model image and the occlusal model image; and identifying a type of the object from the identification information.

11. The method of claim 1, further comprising:

recognizing a scan region on a tray on which the object to be scanned is arranged;

determining whether the object is located outside the scan region; and outputting a notification signal when it is determined that the object is located outside the scan region.

12. A device for processing an oral image, the device comprising a processor that executes at least one instruction, wherein the processor scans two or more of a maxillary base model, a mandibular base model, and an abutment model together to obtain a multiple model image, scans an occlusal model to obtain an occlusal model image, the occlusal model having a shape in which the maxillary base model and the mandibular base model are occluded, and aligns overlapping regions of the multiple model image and the occlusal model image with each other to obtain a three-dimensional oral model, wherein the abutment model is detachable from a base model, the base model being either the maxillary base model or the mandibular base model, wherein the processor obtains the multiple model image by identifying whether the base model is an abutment-separated base model, from which the abutment model is separated, or an abutment-coupled base model, into which the abutment model is inserted, and according to whether the base model is the abutment-separated base model or the abutment-coupled base model, determining which images among a base model image, the occlusal model image, and an abutment model image are to be first aligned.

13. The device of claim 12, wherein the processor uses a neural network that has been trained to identify an object from a plurality of oral images to thereby identify an object to be scanned in the multiple model image and the occlusal model image.

14. The device of claim 12, wherein the processor recognizes a scan region on a tray on which an object to be scanned is arranged, determines whether the object is located outside the scan region, and outputs a notification signal when it is determined that the object is located outside the scan region.

15. A non-transitory computer-readable recording medium on which a program for performing a method for processing an oral image is recorded, wherein the method comprises:

scanning two or more of a maxillary base model, a mandibular base model, and an abutment model together to obtain a multiple model image;

scanning an occlusal model to obtain an occlusal model image, the occlusal model having a shape in which the maxillary base model and the mandibular base model are occluded; and aligning overlapping regions of the multiple model image and the occlusal model image to obtain a three-dimensional oral model, wherein the abutment model is detachable from a base model, the base model being either the maxillary base model or the mandibular base model, wherein the obtaining the multiple model image comprises:

identifying whether the base model is an abutment-separated base model, from which the abutment model is separated, or an abutment-coupled base model, into which the abutment model is inserted, and according to whether the base model is the abutment-separated base model or the abutment-coupled base model, determining which images among a base model image, the occlusal model image, and an abutment model image are to be first aligned.

\*  \*  \*  \*  \*